(12) United States Patent
Hafendorfer et al.

(10) Patent No.: US 7,644,846 B2
(45) Date of Patent: Jan. 12, 2010

(54) APPARATUS FOR RESTRICTING MOVEMENT OF A LAWN IMPLEMENT SHAFT DURING STORAGE OR TRANSPORTATION THEREOF

(75) Inventors: James Thomas Hafendorfer, Louisville, KY (US); Blake Thomas Whitley, LaGrange, KY (US); David William Schardein, Louisville, KY (US)

(73) Assignee: Jungle Jim's Accessory Products, Inc., Louisville, KY (US)

( * ) Notice: Subject to any disclaimer, the term of this patent is extended or adjusted under 35 U.S.C. 154(b) by 761 days.

(21) Appl. No.: 11/292,680

(22) Filed: Dec. 2, 2005

(65) Prior Publication Data
US 2007/0090069 A1 Apr. 26, 2007

Related U.S. Application Data

(60) Provisional application No. 60/728,830, filed on Oct. 22, 2005.

(51) Int. Cl.
*B60R 70/08* (2006.01)
*F16B 45/04* (2006.01)

(52) U.S. Cl. ............... 224/405; 211/60.1; 248/305; 248/316.4

(58) Field of Classification Search ............ 211/70.5, 211/70.4, 60.1, 64, 70.6, 70.8; 224/402, 224/403, 405; 248/297.21, 305, 307, 316.4
See application file for complete search history.

(56) References Cited

U.S. PATENT DOCUMENTS

| | | | | |
|---|---|---|---|---|
| 2,955,789 | A * | 10/1960 | Smith | 211/70.6 |
| 4,596,334 | A * | 6/1986 | Daulton | 224/402 |
| 5,647,489 | A * | 7/1997 | Bellis, Jr. | 211/70.6 |
| 5,676,257 | A * | 10/1997 | Adkins | 224/402 |
| 5,964,358 | A * | 10/1999 | Hafendorfer et al. | 211/70.6 |
| 6,073,781 | A * | 6/2000 | Puglisi | 211/70.6 |
| 6,173,842 | B1 * | 1/2001 | Fitzgerald | 224/324 |
| 6,409,029 | B1 * | 6/2002 | Bermes | 248/316.5 |
| 6,488,151 | B2 * | 12/2002 | Ramsey et al. | 206/378 |
| 6,619,485 | B1 * | 9/2003 | Jenkins | 224/405 |
| 6,983,853 | B1 * | 1/2006 | Fickett | 248/307 |

* cited by examiner

*Primary Examiner*—Michael Safavi
(74) *Attorney, Agent, or Firm*—Stoll Keenon Ogden PLLC; David J. Clement; Justin M. Tromp

(57) ABSTRACT

Apparatus for restricting movement of a lawn implement shaft, for use in a lawn implement support system in cooperation with a vertically upstanding support member for horizontal support of shafted lawn implements during storage or transportation thereof including a support post for supporting a first end of a shafted lawn implement in conjunction with the vertically upstanding support member for supporting a second end of the shafted lawn implement. Further the apparatus includes a shaft support hook mounted to the support post, and projecting outwardly therefrom for a predetermined distance, the support hook being curved generally vertically and at a predetermined angle away from a first generally vertical plane defined by the support post, with a distal end of the shaft support hook being curved back toward a second vertical plane defined by the support post and perpendicular to the first vertical plane to define a shaft support region intermediate the hook and the support post. The present apparatus also includes a compression pin adjustably mounted to the support post adjacent the support hook for sliding movement therealong, the compression pin including a shaft abutment surface; and a device for fixing the compression pin at a predetermined position along the support post for restrictive contact with the lawn implement shaft.

4 Claims, 8 Drawing Sheets

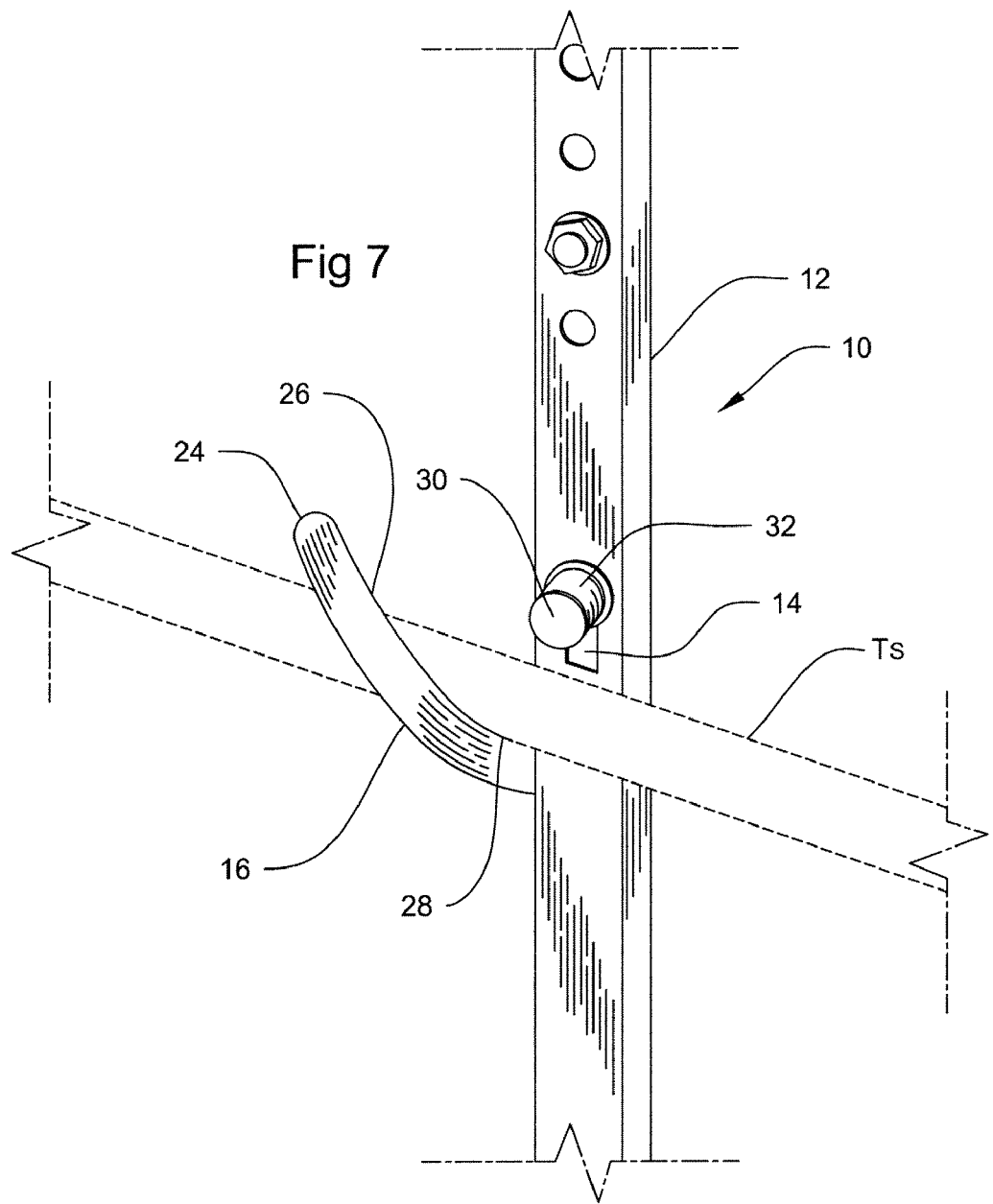

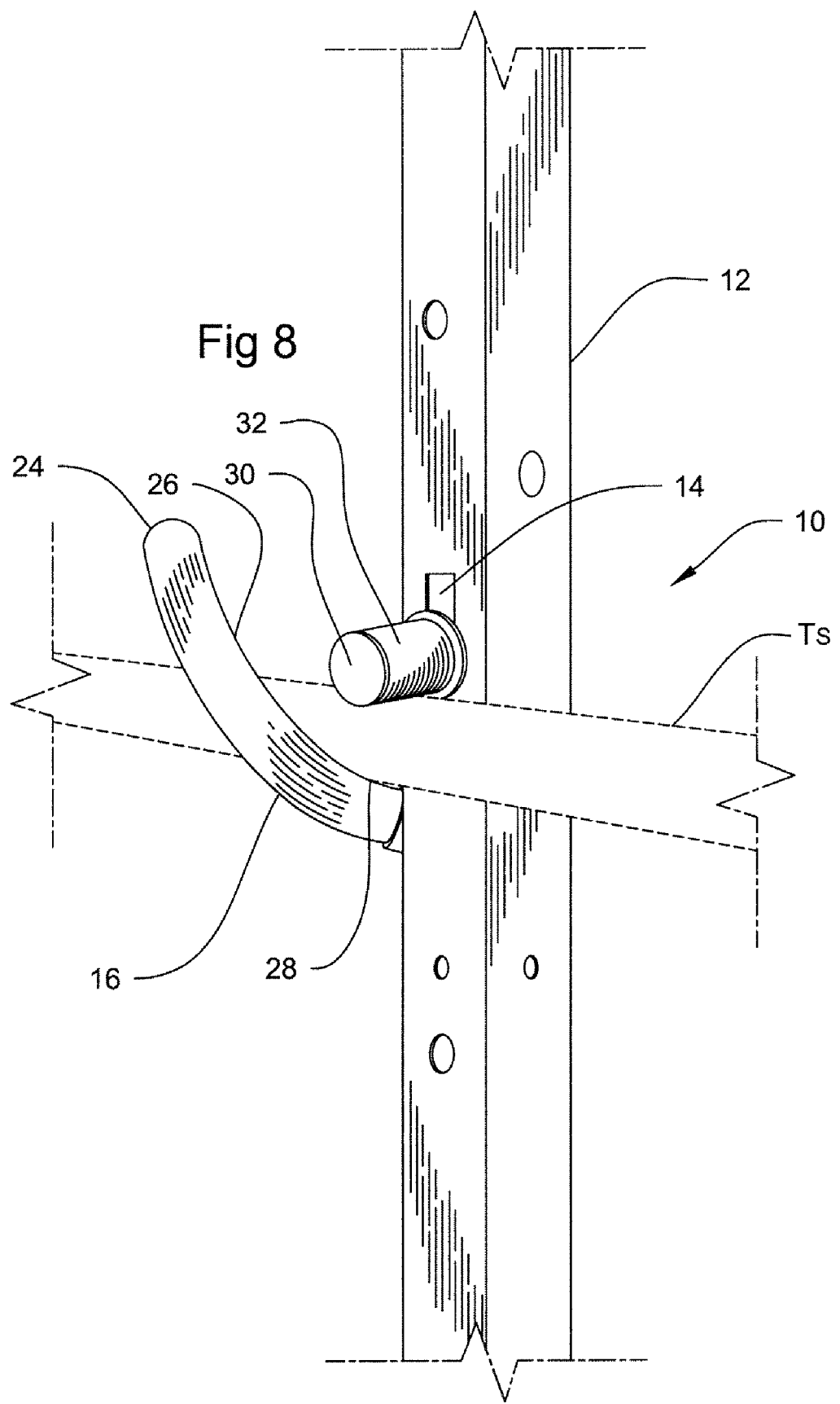

APPARATUS FOR RESTRICTING MOVEMENT OF A LAWN IMPLEMENT SHAFT DURING STORAGE OR TRANSPORTATION THEREOF

CROSS-REFERENCE TO RELATED APPLICATION

This application claims the benefit of U.S. Provisional Patent Application No. 60/728,830 filed Oct. 22, 2005.

BACKGROUND OF THE INVENTION

The present invention relates broadly to racks and other skeletal support systems for tools and, more particularly, to an apparatus for restricting movement of a lawn implement for use with a lawn implement support system for storage or transportation thereof. The lawn implement is preferably a string trimmer having an elongate shaft.

Commercial lawn maintenance providers typically carry a number of lawn implements from job to job including string trimmers. As is generally known, string trimmers are lawn implements having an elongate shaft with a motor on one end of the shaft and a string head on the other end of the shaft. Such implements are considered a requirement in providing proper lawn care.

Trailers towed by pickups are typically used in transporting lawn implements from job to job. It is known to provide racks for string trimmers which are fitted to the sides of the trailers, projecting upwardly therefrom. These racks include vertical posts which are spaced a predetermined distance apart and support a plurality of string trimmers. Typically, some form of hook or tie is used to attached the string trimmer to the rack. Often, the string trimmers are loosely supported on the racks and the trimmers are bounced and jostled about as the suspensionless or barely-sprung trailer is towed behind a pickup truck. Further, the loosely held string trimmers may be susceptible to theft.

It would therefore increase the life of the string trimmers if they could be held more tightly against the rack.

SUMMARY OF THE INVENTION

It is accordingly an object of the present invention to provide a string trimmer rack that securely retains a string trimmer in a loaded position to prevent bouncing movement of the string trimmer in the rack.

It is another object of the present invention to provide such a rack and method of use that prevents all unwanted movement of the string trimmer within the confines of a string trimmer support member.

To those ends, the present invention provides an apparatus for restricting movement of a lawn implement shaft, for use in a lawn implement support system in cooperation with a vertically upstanding support member for horizontal support of shafted lawn implements during storage or transportation thereof. The apparatus includes a generally vertically upstanding support post for supporting a first end of a shafted lawn implement in conjunction with the vertically upstanding support member for supporting a second end of the shafted lawn implement. Further the apparatus includes a shaft support hook mounted to the support post, and projecting outwardly therefrom for a predetermined distance, the support hook being curved generally vertically and at a predetermined angle away from a first generally vertical plane defined by the support post, with a distal end of the shaft support hook being curved back toward a second vertical plane defined by the support post and perpendicular to the first vertical plane to define a shaft support region intermediate the hook and the support post. The present apparatus also includes a compression pin adjustably mounted to the support post adjacent the support hook for sliding movement therealong, the compression pin including a shaft abutment surface; and a device for fixing the compression pin at a predetermined position along the support post for restrictive contact with the lawn implement shaft.

Preferably, the support hook includes a traction surface formed thereon for enhanced gripping of a lawn implement shaft. Further the compression pin may be formed as a cylinder and includes a traction surface formed thereon for enhanced gripping of a lawn implement shaft.

It is preferable that the compression pin is formed as a cylinder having a threaded bore formed therein and wherein the device for fixing the compression pin at a predetermined position includes a bolt and washer arrangement with the bolt being fitted to the threaded bore, the compression pin being mounted to the post along a slot formed therein with the compression pin being moveable along the slot.

It is further preferred that the compression pin is spaced a predetermined distance laterally away from the support hook. Preferentially, at least a portion the support hook is disposed at an angle between about 30 and 60 degrees from a vertical plane defined by the post. More preferably, at least a portion the support hook is disposed at an angle of about 40 degrees from a vertical plane defined by the post.

According to another preferred embodiment, the apparatus for restricting movement of a lawn implement shaft, includes a generally vertically upstanding support post for supporting a first end of a shafted lawn implement in conjunction with the vertically upstanding support member for supporting a second end of the shafted lawn implement; a shaft support hook mounted to the support post, and projecting outwardly therefrom for a predetermined distance; a compression pin adjustably mounted to the support post adjacent the support hook for sliding movement therealong, the compression pin including a shaft abutment surface; and a device for fixing the compression pin at a predetermined position along the support post for restrictive contact with the lawn implement shaft.

Preferably, the support hook is curved generally vertically and at a predetermined angle away from a first generally vertical plane defined by the support post, with a distal end of the shaft support hook being curved back toward a second vertical plane defined by the support post and perpendicular to the first vertical plane to define a shaft support region intermediate the hook and the support post. It is further preferred that the support hook includes a traction surface formed thereon for enhanced gripping of a lawn implement shaft.

It is also preferred that the compression pin is formed as a cylinder and includes a traction surface formed thereon for enhanced gripping of a lawn implement shaft. Preferably, the compression pin is formed as a cylinder having a threaded bore formed therein and wherein the device for fixing the compression pin at a predetermined position includes a bolt and washer arrangement with the bolt being fitted to the threaded bore, the compression pin being mounted to the post along a slot formed therein with the compression pin being moveable along the slot.

It is preferred that at least a portion the support hook is disposed at an angle between about 30 and 60 degrees from a vertical plane defined by the post.

According to another preferred embodiment thereof, the present apparatus for restricting movement of a lawn implement shaft, includes a generally vertically upstanding support post for supporting a first end of a shafted lawn implement in conjunction with the vertically upstanding support member for supporting a second end of the shafted lawn implement; and a shaft support hook mounted to the support post, and projecting outwardly therefrom for a predetermined distance, the support hook being curved generally vertically and at a predetermined angle away from a first generally vertical plane defined by the support post, with a distal end of the shaft support hook being curved back toward a second vertical plane defined by the support post and perpendicular to the first vertical plane to define a shaft support region intermediate the hook and the support post.

It is preferred that the present invention further include a compression pin adjustably mounted to the support post adjacent the support hook for sliding movement therealong, the compression pin including a shaft abutment surface; and a device for fixing the compression pin at a predetermined position along the support post for restrictive contact with the lawn implement shaft. Preferably, the compression pin is formed as a cylinder having a threaded bore formed therein and wherein the device for fixing the compression pin at a predetermined position includes a bolt and washer arrangement with the bolt being fitted to the threaded bore, the compression pin being mounted to the post along a slot formed therein with the compression pin being moveable along the slot.

It is further preferred that at least a portion the support hook is disposed at an angle between about 30 and 60 degrees from a vertical plane defined by the post.

The present invention further provides a method for restricting movement of a lawn implement shaft, for application with a lawn implement support system including a vertically upstanding support member for horizontal support of shafted lawn implements during storage or transportation thereof. The present method includes the steps of:

(a) providing a generally vertically upstanding support post for supporting a first end of a shafted lawn implement in conjunction with the vertically upstanding support member for supporting a second end of the shafted lawn implement;

(b) providing a shaft support hook mounted to the support post, and projecting outwardly therefrom for a predetermined distance, the support hook being curved generally vertically and at a predetermined angle away from a first generally vertical plane defined by the support post, with a distal end of the shaft support hook being curved back toward a second vertical plane defined by the support post and perpendicular to the first vertical plane to define a shaft support region intermediate the hook and the support post;

(c) providing a compression pin adjustably mounted to the support post adjacent the support hook for sliding movement therealong, the compression pin including a shaft abutment surface;

(d) a device for fixing the compression pin at a predetermined position along the support post for restrictive contact with the lawn implement shaft;

(e) placing a portion of a shaft of a lawn implement intermediate the support hook and the support post within the shaft support region, with the shaft being disposed upon the hook traction surface and out of contact with the post at an angular relation therewith;

(f) rotating the implement shaft about a generally vertical axis defined by the post to a position intermediate the support hook and the compression pin, with the shaft generally perpendicular to the support post and in abutment therewith, with the distal end of the support hook overcurving a portion of the shaft;

(g) moving the compression pin into a position abutting the shaft;

(h) removing the shaft from the shaft support region by reversing steps (e) and (f);

(i) moving the compression pin a predetermined distance toward the shaft support region;

(j) securing the compression pin in place using the device for fixing the compression pin at a predetermined position; and (k) replacing the shaft in the shaft support region by repeating steps (e) and (f) resulting in the shaft being securely held in the shaft support region by cooperation of the support hook, the compression pin and the support post.

Preferably the method includes the step of providing a compression pin includes providing a compression pin formed as a cylinder having a threaded bore formed therein and wherein the device for fixing the compression pin at a predetermined position includes a bolt and washer arrangement with the bolt being fitted to the threaded bore, the compression pin being mounted to the post along a slot formed therein with the compression pin being moveable along the slot.

The method further preferably includes the step of securing the compression pin in place using the device for fixing the compression pin at a predetermined position includes tightening the bolt against the post to retain the compression pin in place.

It is further preferred that the method include the step of moving the compression pin a predetermined distance toward the shaft support region includes moving the compression pin a distance of approximately ⅛ inch.

Preferentially, the step of providing a support hook includes providing a support hook wherein at least a portion the support hook is disposed at an angle between about 30 and 60 degrees from a vertical plane defined by the post. It is further preferred that the method include the step of providing a support hook includes providing a support hook wherein at least a portion the support hook is disposed at an angle of about 40 degrees from a vertical plane defined by the post.

The present invention can be described in greater detail as an apparatus for restricting movement of a lawn implement shaft, for use in a lawn implement support system in cooperation with a vertically upstanding support member for horizontal support of shafted lawn implements during storage or transportation thereof. The present apparatus includes a generally vertically upstanding support post for supporting a first end of a shafted lawn implement in conjunction with the vertically upstanding support member for supporting a second end of the shafted lawn implement, the support post being formed with a slot therein.

Further includes is a shaft support hook mounted to the support post adjacent the slot, and projecting laterally outwardly from the support post for a predetermined distance, the support hook being curved generally vertically in a manner diverging from the support post with at least a portion the support hook disposed at an angle between about 30 and 60 degrees from a vertical plane defined by the support post, with a distal end of the shaft support hook being curved back toward a second vertical plane defined by the support post and perpendicular to the first vertical plane to define a shaft support region intermediate the hook and the support post.

The present invention preferably further includes a compression pin formed as a cylinder having a threaded bore formed therein and adjustably mounted to the support post adjacent the support hook at a predetermined spacing therefrom, for sliding movement along the slot and thereby the support post, the compression pin including a shaft abutment surface and a device for fixing the compression pin at a predetermined position along the support post for restrictive contact with the lawn implement shaft including a bolt and washer arrangement with the bolt being fitted to the threaded bore.

Preferably, the apparatus includes the support hook includes a traction surface formed thereon for enhanced gripping of a lawn implement shaft. It is further preferred that the compression pin is formed as a cylinder and includes a traction surface formed thereon for enhanced gripping of a lawn implement shaft.

It is also preferred that at least a portion the support hook is disposed at an angle of about 40 degrees from a vertical plane defined by the post.

BRIEF DESCRIPTION OF THE DRAWINGS

FIG. 7 is a perspective view illustrative of another step according to the method of the present invention; and FIG. 8 is a perspective view of the present invention restricting movement of a lawn implement shaft.

DESCRIPTION OF THE PREFERRED EMBODIMENT

Figure 1:
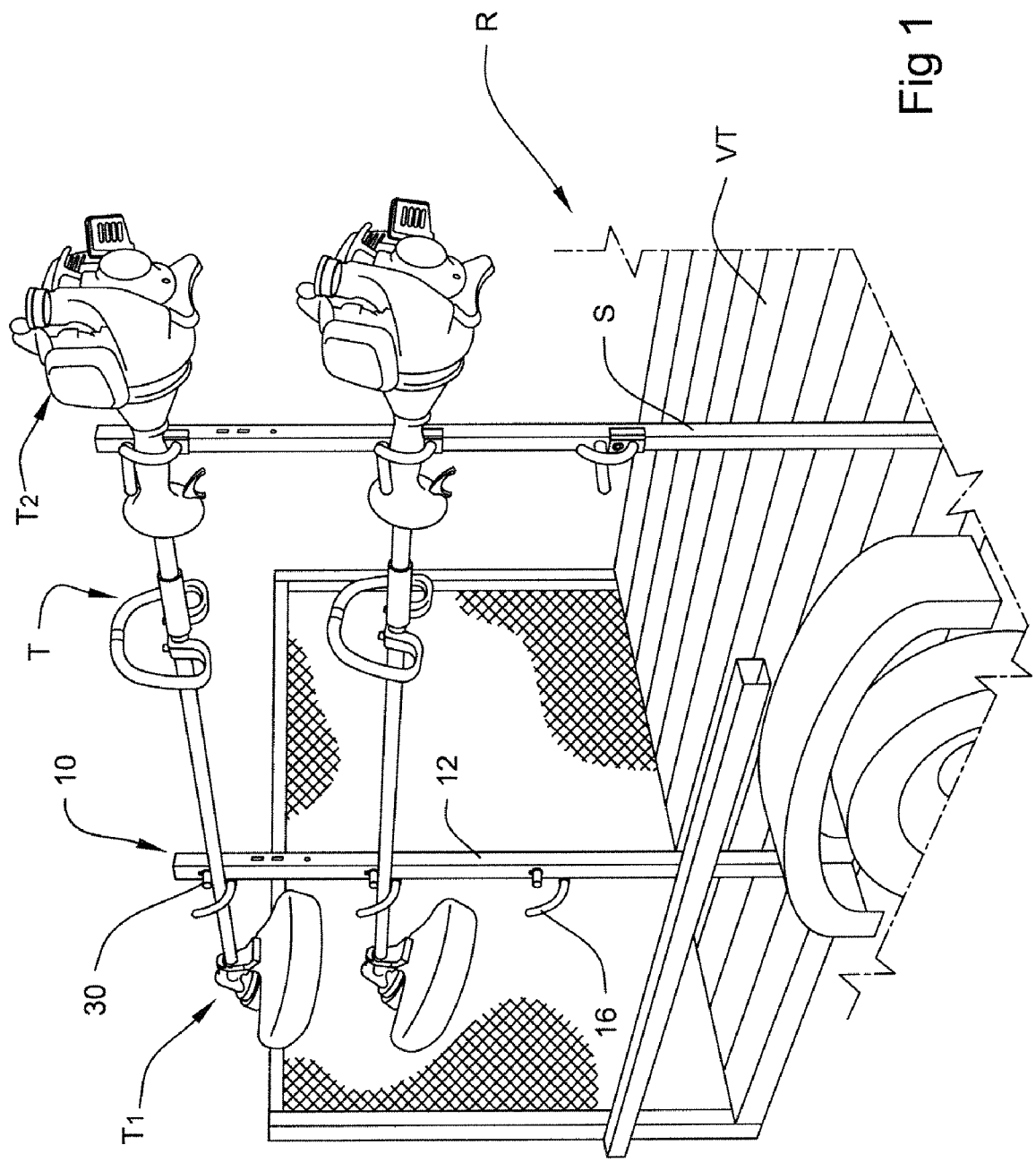
FIG. 1 is a perspective view of a lawn implement support rack featuring an apparatus for restricting movement of a lawn implement shaft according to the preferred embodiment of the present invention.

Turning now to the drawings and, more particularly to FIG. 1, an apparatus for restricting movement of the lawn implement shaft TS during storage and transportation thereof is shown illustrated generally at 10 according to one preferred embodiment of the invention. The apparatus for restricting movement 10 includes a vertically upstanding post 12 which may be a steel "C"-channel or other vertically upstanding member. The post 12 cooperates with a second post S to form a trimmer rack R which is mounted to a vehicular trailer VT. Optionally, the rack R may be mounted to the bed of a pickup truck or any other sort of mounting arrangement which allows two vertically upstanding, parallelly extending horizontally spaced posts for supporting string trimmers or other elongate, shafted lawn implements. A string trimmer T is illustrated in FIG. 1 shown mounted to the rack R with the post 12 supporting a first end T1 of the trimmer T and the second post S supporting the second end T2 of the trimmer T with the majority of the trimmer shaft TS extending therebetween.

Figure 2:
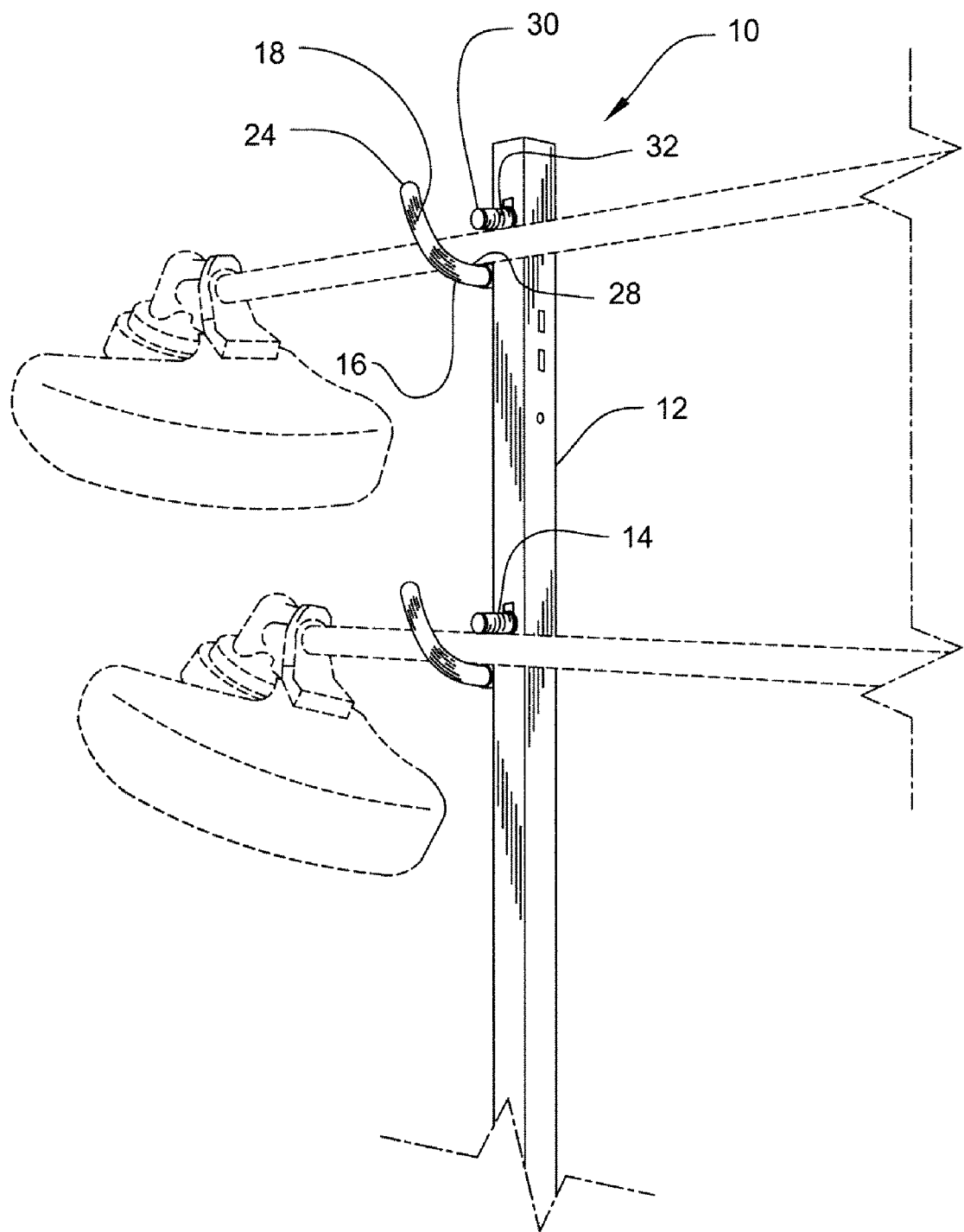
FIG. 2 is a perspective view of an apparatus for restricting movement of a lawn implement shaft according to the preferred embodiment of the present invention.
Figure 4:
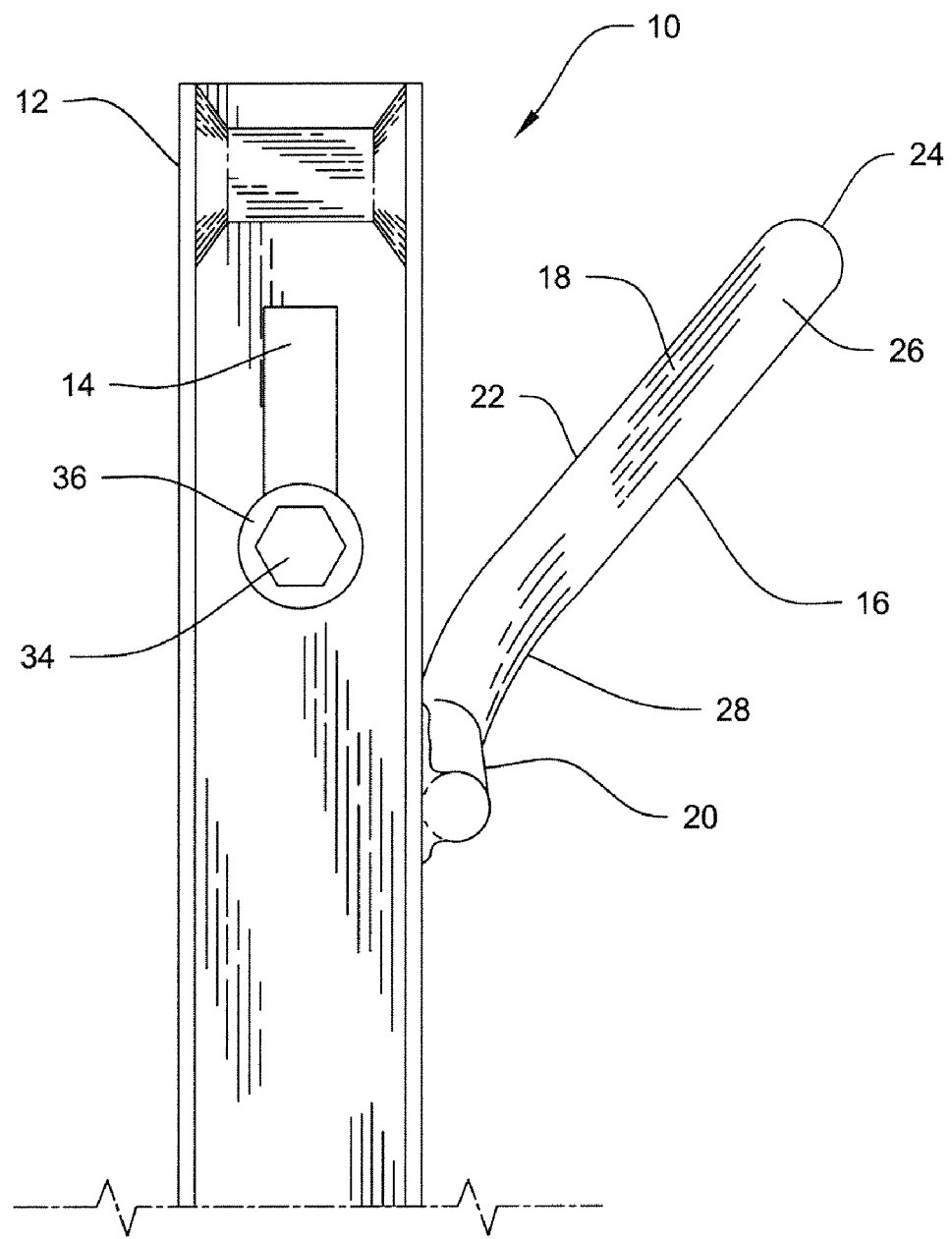
FIG. 4 is rear view of the support post according to the resent invention illustration the device to for fixing the compression pin at a predetermined position along the support post.
Figure 5:
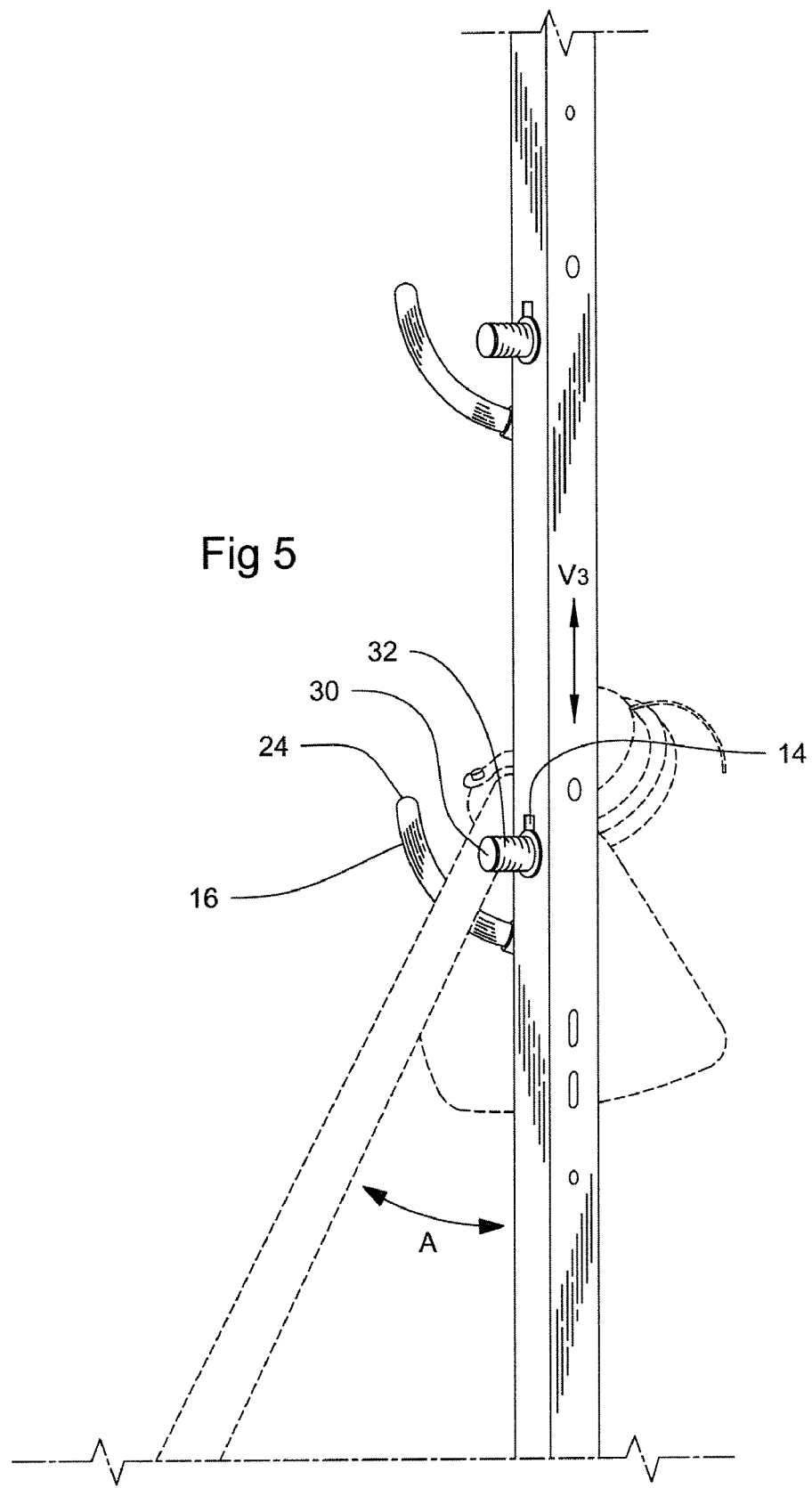
FIG. 5 is a perspective view illustrative of a step for a method for restricting movement of a lawn implement shaft according to the preferred embodiment of the present invention.

Turning now to FIG. 2, the present apparatus for restricting movement 10 is shown in greater detail. The remainder of the apparatus 10 includes a curved hook 16 which is mounted to one side of the post as seen in FIGS. 2 and 4. The present apparatus 10 also includes a compression pin 30 which is mounted to a slot 14 in the post 12 for sliding movement therealong. It should be noted and as is apparent from the figures, multiple hooks and pin combinations may be disposed vertically along the post 12 in order to accommodate a multiplicity of string trimmers on a single rack R.

It should also be known that the present invention is adaptable to several configurations and while it is preferred that the hook 16 cooperate with the compression pin 30 to provide a solid support for the string trimmer shaft TS it is contemplated that the hook 16 may stand alone without the compression pin 30. Further, the hook 16 need not be curved, as will be explained in greater detail hereinafter, to cooperate with a compression pin 30. Therefore, the compression pin 30 could hold the trimmer shaft TS in place with a variety lower support members mounted to the post 12 in a manner disclosed by the hook 16. It is well within the skill of one of ordinary skill in this art to determine whether a hook and pin arrangement, a hook only arrangement, or a pin and basic lower support member arrangement will most effectively fill a need.

Figure 3:
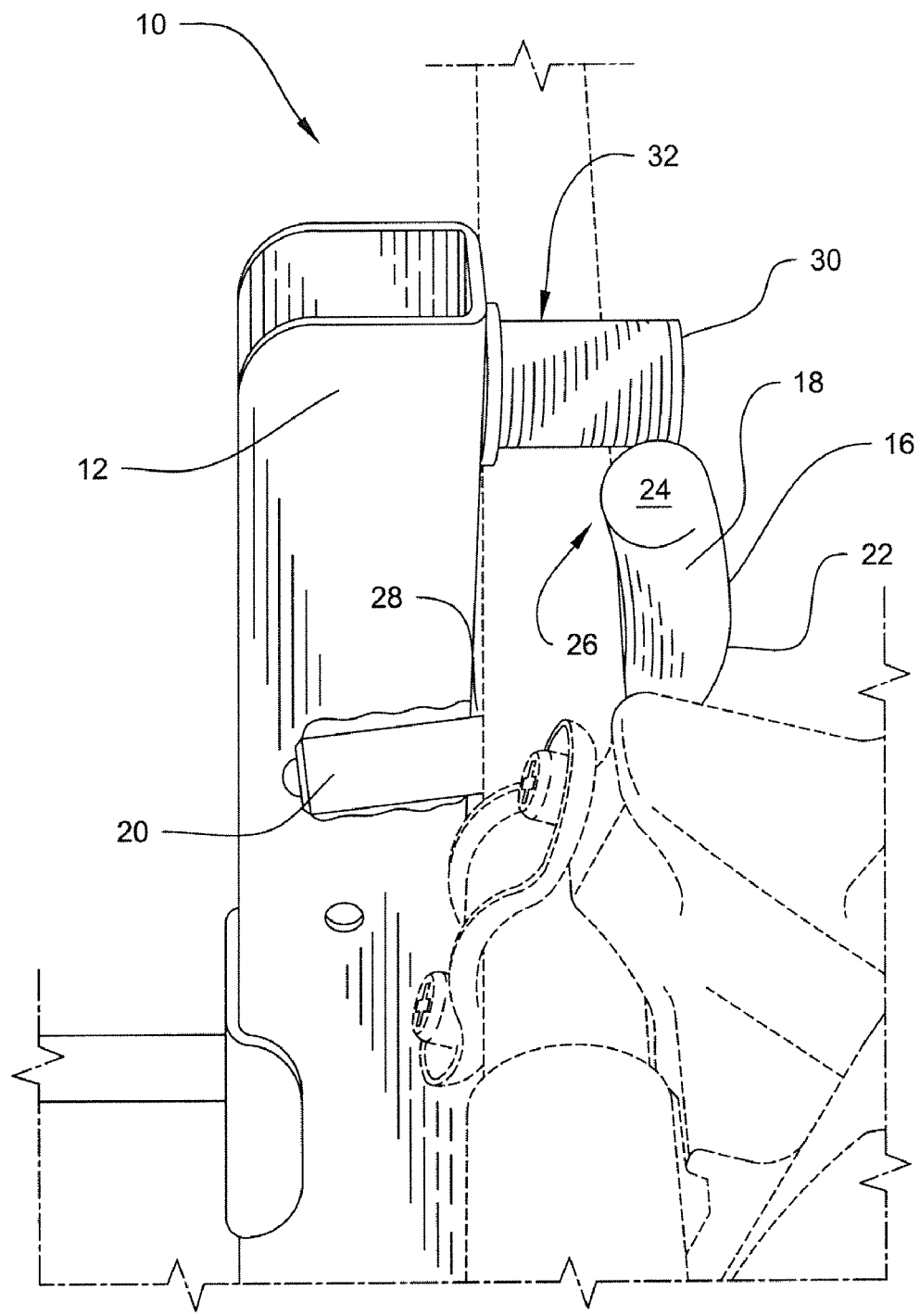
FIG. 3 is an elevational view of the support hook and pin illustrated in FIG. 2.

As seen in FIGS. 2, 3 and 4, the hook 20 is welded or otherwise fixed to the post 12 at a base portion 20 for projection laterally away from the post 12. The base portion 20 is arranged in a generally perpendicular manner with the post 12. As the hook emerges from the post 12, it curves upwardly through an intermediate curved region 12 to form a support portion 28 in the well of the curve. As best seen in FIG. 26, approaching the distal end of the hook 24 an over curve portion 26 curves back towards the post 12. As seen in FIG. 3, the over curve portion 26 is so named because it curves back over the trimmer shaft TS slightly so as to put the trimmer shaft TS in a bind or under a bending moment when it is supported in the support portion 28 of the hook 16. The hook 16 may be partially or fully covered with rubber thereby forming a traction surface 18 so that the shaft TS is less likely to slide therealong.

With continued reference to FIGS. 2, 3 and 4, the compression pin 30 is a generally cylindrical member which may be fitted with a rubber sleeve 32 to provide a traction surface in the same manner as the rubber coating 18 of the hook 16. The compression pin 30 is formed with threaded bore (not shown) and is mounted to the post 12 through a slot 14 formed therein with a bolt 34 in registry with the threaded bore with the bolt 34 extending through the slot 14. A washer 36 is fitted intermediate the post 12 and the bolt 34 for a positive grip on the post 12. When the bolt 34 is loosened, the compression pin 30 may be moved vertically along the slot 14.

While the present invention operates in a preferred manner using the hook 16 and compression pin 30 in tandem, there are other configurations available to the user. For example, the hook 16 may be used without a compression pin 30 with the curvature, especially the overcurve area 26 providing gripping action for the trimmer shaft TS.

Optionally, the compression pin 30 may be used with a conventional hook or other support member (not shown) to bind a trimmer shaft TS between the compression pin and the alternate support member.

Figure 6:
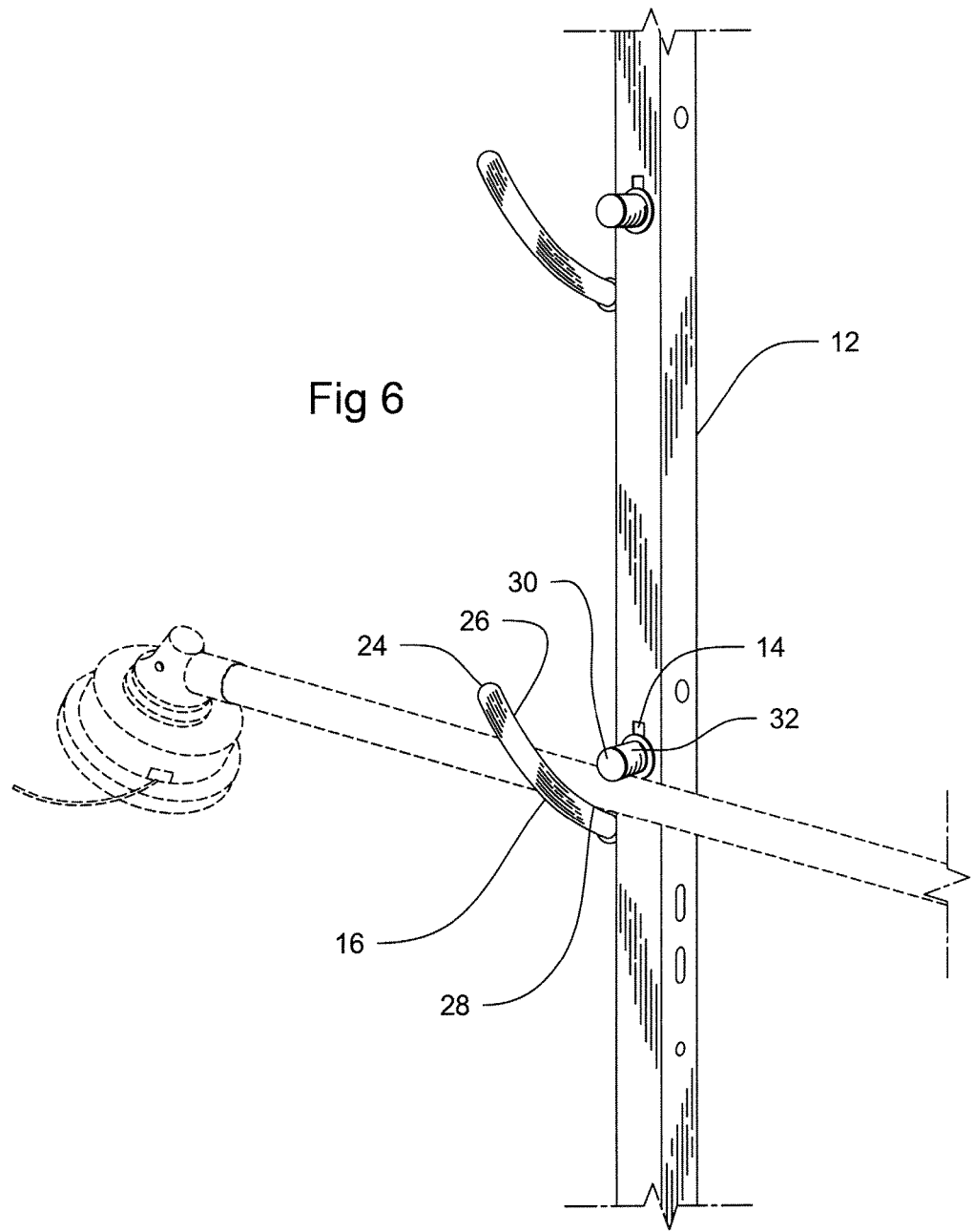
FIG. 6 is a perspective view illustrative of another step according to the method of the present invention.

Turning now to FIGS. 5-8, operation of the present invention is preferably carried out according to a predetermined method for restricting movement of lawn implement shaft TS. According to the method, and utilizing the apparatus 10 of the present invention, a portion of the shaft TS of the lawn implement is placed intermediate the support hook 16 and the post 12 within the shaft support region 26 with the shaft TS disposed upon a support hook traction surface 18 and out of contact with the post 12 in an angular relation A therewith and in a manner generally parallel to the ground. The implement shaft TS is then rotated about a generally vertical axis V3 defined by the post 12 to a position intermediate the support hook 16 and the compression pin 30 with the shaft TS generally perpendicular to the post 12 in an abutment therewith and with the distal end 24 of the support hook 16 overcurving a portion of the shaft TS as was discussed previously. The result of this rotation is illustrated in FIG. 6.

The bolt 34 is loosened on the compression pin 30 and the compression pin 30 is lowered through the slot 14 into a position where the traction surface 32 of the compression pin 30 is in contact with the implement shaft TS. This bolt 34 is then hand tightened. The trimmer T is then removed from the device. Next, the bolt 34 is loosened slightly and the compression pin 30 is moved downwardly approximately ⅛" and the bolt 34 tightened securely to lock the compression pin 30 in position.

The steps described previously for insertion of the trimmer shaft TS are then repeated and during the final step, the trimmer shaft TS is moved into abutment with both the trimmer support portion 28 of the hook 16 and in abutment with the traction surface 32 of the compression pin 30. In this manner, the trimmer shaft TS is held in the dual binding moments created by the compression pin 30 and the overcurve 26 of the hook 16. The string trimmer T is then securely in place and the apparatus 10 is adjusted properly for the size of the trimmer shaft TS being used. Therefore, further adjustment of the compression pin 30 should not be necessary unless a different trimmer with a different diameter shaft is used. Each time the apparatus 10 is used after the initial adjustment, no adjustment of the compression pin 30 should be necessary.

By the above, the present invention provides an effective, simple device to retain the shaft of a string trimmer in a tightly held manner resulting in less damage and less theft of the string trimmers.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

We claim:

1. An apparatus for restricting movement of a lawn implement shaft, for use in a lawn implement support system in cooperation with a vertically upstanding support member for horizontal support of shafted lawn implements during storage or transportation thereof, said apparatus comprising:

a generally vertically upstanding support post for supporting a first end of a shafted lawn implement in conjunction with the vertically upstanding support member for supporting a second end of the shafted lawn implement, said support post being formed with a slot therein;

a shaft support hook mounted to said support post adjacent said slot, and projecting laterally outwardly from said support post for a predetermined distance, said support hook being curved generally vertically in a manner diverging from said support post with at least a portion said support hook disposed at an angle between about 30 and 60 degrees from a vertical plane defined by said support post, with a distal end of said shaft support hook being curved back toward a second vertical plane defined by said support post and perpendicular to said first vertical plane to define a shaft support region intermediate said hook and said support post;

a compression pin formed as a cylinder having a threaded bore formed therein and adjustably mounted to said support post adjacent said support hook at a predetermined spacing therefrom, for sliding movement along said slot and thereby said support post, said compression pin including a shaft abutment surface; and a device for fixing said compression pin at a predetermined position along said support post for restrictive contact with the lawn implement shaft including a bolt and washer arrangement with said bolt being fitted to said threaded bore.

2. An apparatus for restricting movement of a lawn implement shaft according to claim 1 wherein at least a portion said support hook is disposed at an angle of about 40 degrees from a vertical plane defined by the post.

3. An apparatus for restricting movement of a lawn implement shaft, for use in a lawn implement support system in cooperation with a vertically upstanding support member for horizontal support of shafted lawn implements during storage or transportation thereof, said apparatus comprising:

a generally vertically upstanding support post for supporting a first end of a shafted lawn implement in conjunction with the vertically upstanding support member for supporting a second end of the shafted lawn implement;

a shaft support hook mounted to said support post, and projecting outwardly therefrom for a predetermined distance, said support hook being curved generally vertically and at a predetermined angle away from a first generally vertical plane defined by said support post, with a distal end of said shaft support hook being curved back toward a second vertical plane defined by said support post and perpendicular to said first vertical plane to define a shaft support region intermediate said hook and said support post;

a compression pin adjustably mounted to said support post adjacent said support hook for sliding movement therealong, said compression pin including a shaft abutment surface; and a device for fixing said compression pin at a predetermined position along said support post for restrictive contact with the lawn implement shaft;

wherein said compression pin is formed as a cylinder having a threaded bore formed therein and wherein said device for fixing said compression pin at a predetermined position includes a bolt and washer arrangement with said bolt being fitted to said threaded bore, said compression pin being mounted to the post along a slot formed therein with said compression pin being moveable along said slot.

4. An apparatus for restricting movement of a lawn implement shaft, for use in a lawn implement support system in cooperation with a vertically upstanding support member for horizontal support of shafted lawn implements during storage or transportation thereof, said apparatus comprising:

a generally vertically upstanding support post for supporting a first end of a shafted lawn implement in conjunction with the vertically upstanding support member for supporting a second end of the shafted lawn implement;

a shaft support hook mounted to said support post, and projecting outwardly therefrom for a predetermined distance;

a compression pin adjustably mounted to said support post adjacent said support hook for sliding movement therealong, said compression pin including a shaft abutment surface; and a device for fixing said compression pin at a predetermined position along said support post for restrictive contact with the lawn implement shaft;

wherein said compression pin is formed as a cylinder having a threaded bore formed therein and wherein said device for fixing said compression pin at a predetermined position includes a bolt and washer arrangement with said bolt being fitted to said threaded bore, said compression pin being mounted to the post along a slot formed therein with said compression pin being moveable along said slot.

* * * * *